(12) United States Patent
Ding et al.

(10) Patent No.: US 8,139,634 B2
(45) Date of Patent: Mar. 20, 2012

(54) METHODS AND APPARATUSES OF FAST CROSS MOTION ESTIMATION FOR VIDEO ENCODING

(75) Inventors: Yaqiang Ding, Shanghai (CN); Jiang Lin, Shanghai (CN); Fu-Huei Lin, Cupertino, CA (US)

(73) Assignee: Spreadtrum Communications, Inc., George Town, Grand Cayman (KY)

( * ) Notice: Subject to any disclaimer, the term of this patent is extended or adjusted under 35 U.S.C. 154(b) by 1351 days.

(21) Appl. No.: 11/712,845

(22) Filed: Feb. 28, 2007

(65) Prior Publication Data

US 2007/0206677 A1 Sep. 6, 2007

(30) Foreign Application Priority Data

Feb. 28, 2006 (CN) .......................... 2006 1 0024246

(51) Int. Cl.
*H04N 11/02* (2006.01)

(52) U.S. Cl. .......... 375/240.01; 375/240.12; 375/240.16

(58) Field of Classification Search .................. 375/240, 375/240.01, 240.12, 240.16
See application file for complete search history.

(56) References Cited

U.S. PATENT DOCUMENTS 7,675,974 B2 * 3/2010 Kawashima ............. 375/240.16
2006/0203912 A1 * 9/2006 Kodama ................... 375/240.16

* cited by examiner

*Primary Examiner* — Hosuk Song

(57) ABSTRACT

This disclosure is related to a fast motion estimation method for implementing in a video encoder. A particular method includes determining early termination based on the value of a sum of absolute difference (SAD0). The method also includes performing motion prediction using a motion vector from a previous frame as a prediction point. The method further includes using the prediction point as the center to obtain the integral motion vector by conducting a 3×3 cross searching until a minimum sum of absolute difference (min-SAD) is located at the center of the cross and predicting a location of a half-pixel point based upon a point corresponding to the integral motion vector, values of the minimum sum of absolute difference of other four cross points.

4 Claims, 2 Drawing Sheets

METHODS AND APPARATUSES OF FAST CROSS MOTION ESTIMATION FOR VIDEO ENCODING

CROSS-REFERENCE TO RELATED APPLICATION(S)

This application claims priority to Chinese patent application No. 200610024246.8, filed on Feb. 28, 2006, the disclosure of which is incorporated herein by reference in its entirety.

TECHNICAL FIELD

The present disclosure is related to digital video encoding; in particular, the present disclosure is related to fast cross-motion estimation methods for video encoding.

BACKGROUND

In video encoding, motion estimation is one of the speed bottlenecks during encoding. A fast and accurate motion estimation method can reduce the command period (as measured by millions instructions per second) in a platform implementing video encoding.

Conventional motion estimation methods include, for example, the three-step search (TSS). The three-step search has a fixed searching pattern and its first search step can be rather imprecise. As a result, the search can easily be trapped in a local minimal value. Thus, the three-step search method can be ineffective for relatively small motion vectors.

In another example, the diamond search method is another conventional motion estimation method that is named after the shape of its searching pattern. The diamond search method is simple and effective, and is one of the best searching methods currently available. The basic principle of the diamond search method is to optimize the motion estimation speed and accuracy using the shape and size of the searching pattern. One drawback of the diamond search method is that when searching the optimal match point, if a small search pattern is used, the small search pattern can trap the search into local minimal; if a large search pattern is used, then the search might not be able to find the optimal match point. As a result, the diamond search method typically uses two sets of shapes and sizes of search patterns based on the basic principal of motion vectors in video images. The search patterns can include:

1. Large diamond search pattern (LDSP) includes nine potential positions.
2. Small diamond search pattern (SDSP) includes five potential positions.

The search process of the diamond search method is as follows: during an initial period, the large diamond search pattern is repeatedly used until the optimal matching block is located in the center of the large diamond. Because the large diamond search pattern has a long search step, the search scope can be large. Thus, the large diamond search pattern can be used as a coarse search tool to prevent the search from being trapped in a local minimal. After the coarse search is completed, it is believed the optimal point is within the diamond formed by eight points surrounding the large diamond search pattern. Then, the small diamond search pattern is used to achieve the precise location of the optimal matching block to avoid a large amount of fluctuation for improved accuracy of motion estimation. Thus, the diamond search method can be convoluted.

As described above, all of the conventional search methods have their own drawbacks. For example, none of these methods can significantly improve the encoder performance in actual semiconductor devices.

DETAILED DESCRIPTION

A particular method of the present disclosure provides a fast cross-motion estimation method for encoding video. The method includes determining whether to stop searching based on the value of SAD0.

$$\text{THRESHOLD} = -500 + \text{MAP}(QP) \times 256,$$

where MAP(QP) is adjustable.

If SAD0 is less than or equal to the THRESHOLD, then stop searching and set the motion vector to zero; otherwise the method further includes performing motion estimation using the motion vector in a previous frame as a prediction point. If the present frame is the first P-frame in the group of pictures (GOP), then use location (0,0) as the prediction point and choose the smaller of SAD0 and SADpred as the real estimation point as shown in the following formula:

$$\text{SADpred} = \min(\text{SADpred}, \text{SAD0})$$

If SADpred is less than or equal to the threshold (where threshold=$-500+\text{MAP}(QP)\times 256$), then stop searching and set the motion vector to that of the prediction point; otherwise use the prediction point as the center to conduct a 3×3 cross searching until minSAD Is Located at the center of the cross to obtain the integer motion vector.

The method further includes predicting the location of the half-pixel point based on the point corresponding to the integral motion vector, and the minimum SAD value of other four cross points obtained from the previous step as follows:

$$\text{SAD\_pred} = \min(\text{SAD}[k])$$

where K=0, 1, 2, 3 . . . .

If SAD_halfpred is less than min(SAD), then the final motion vector is the motion vector corresponding to the half pixel point; otherwise, the final motion vector is set to the integral motion vector.

In the foregoing description: THRESHOLD is the threshold value; QP is the quantified step length; Map(QP) is a function based on the quantified step length; ET stands for early termination; SAD0 is the absolute sum of difference at motion offset of (0,0); GOP stands for Group of Pictures; SADpred is the absolute sum of difference at the predicted motion offset; minSAD is the minimum absolute sum of difference; SAD_pred is the absolute sum of difference at predicted half-pixel points; and the MAP function has the following values.

| QP     | 1-7 | 8-11 | 12-15 |
|--------|-----|------|-------|
| MAP(QP) | 4   | 5    | 6     |

Several embodiments of the disclosed method can reduce the amount of calculation for motion estimation in video encoding. It is believed that for the same searching accuracy, the foregoing method of estimating integral motion blocks can be about 4-6 times as fast as the three-step search method. In addition, the half-pixel estimation procedure can significantly increase the speed of half-pixel motion estimation and avoid the interpolation and motion composition necessary in conventional techniques.

Figure 1:
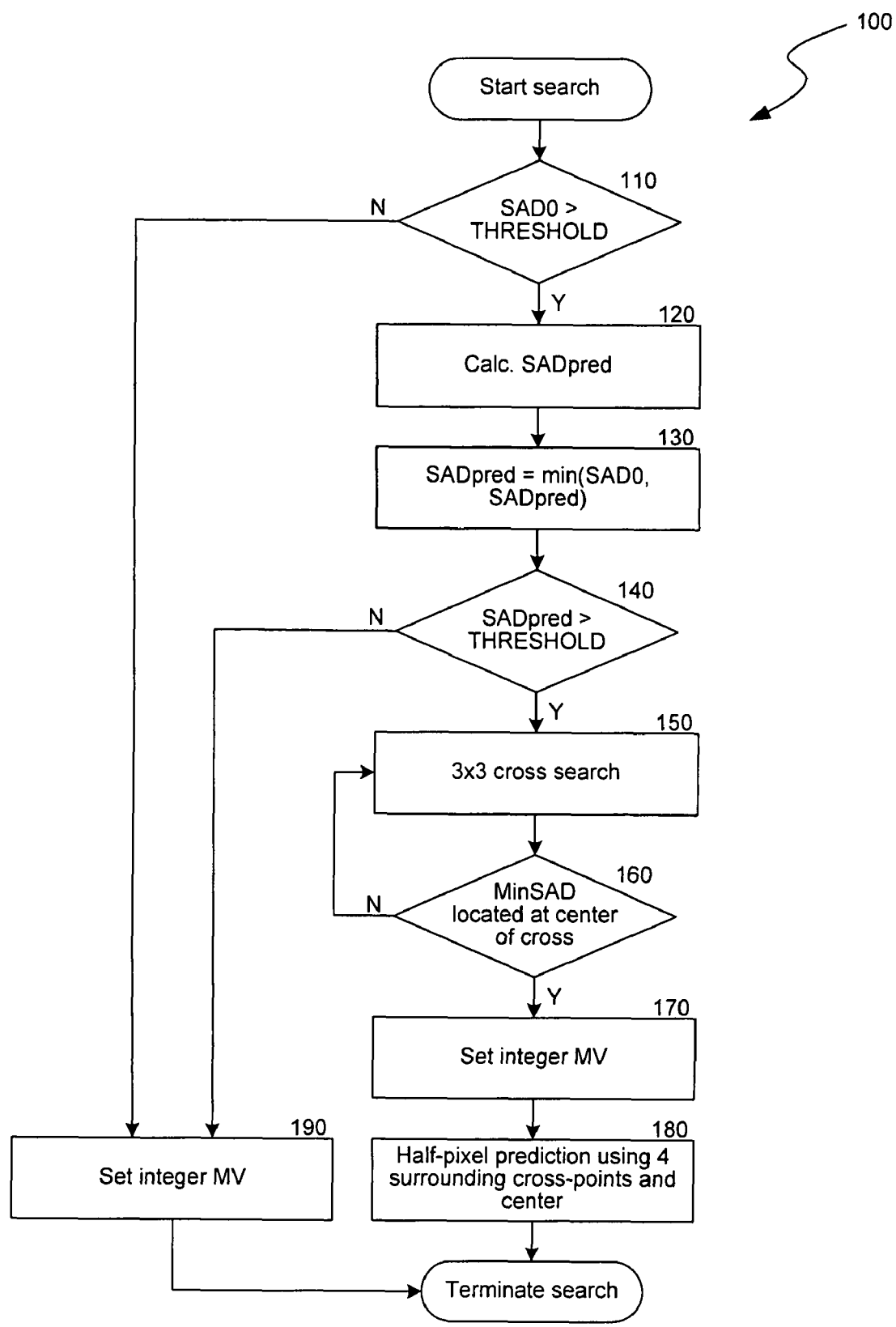
FIG. 1 is a flow chart showing a method in accordance with an embodiment of the present disclosure.

FIG. 1 illustrates another particular method 100 for motion estimation in video encoding includes setting a threshold for early termination based on quantified step length, using the motion vector of previous frame as a prediction point, searching for best matching integer pixel utilizing a cross searching pattern, and use the integral of the minimal absolute accumulated sum and center point as the prediction of the half pixel.

The method includes determining early termination based on the value of SAD0 (block 110):

$$THRESHOLD=-500+MAP(QP)\times 256$$

where MAP(QP) varies with QP.

If SAD0<=THRESHOLD, then early termination is enabled, the final motion vector is set to (0,0), and the motion search is terminated (block 190).

The method also includes performing motion prediction using the motion vector from a previous frame as a prediction point (block 120, 130). If the present frame is the first P-frame of a GOP, then prediction is performed using motion vector (0,0). The point with the smaller SAD when compared to SAD0 is typically used as the predicted point.

$$SADpred=min(SADpred,SAD0)$$

If SADpred<=THRESHOLD (where THRESHOLD=-500+ MAP(QP)×256), then early termination is enabled and the final motion vector is set to that of the prediction point (block 140).

The method further includes using the prediction point as the center to conduct a 3×3 cross searching (block 150) until minSAD is located at the center of the cross (block 160) to obtain the integer motion vector (block 170).

The method further includes predicting the location of the half-pixel point based on the point corresponding to the integral motion vector, and the minimum SAD value of other four cross points obtained from the previous step as follows (block 180):

$$SADpred=min(SAD[k])$$

where K=0, 1, 2, 3 . . . .

If SADhalfpred is less than minSAD, then the final motion vector is the motion vector corresponding to the half pixel point; otherwise, the final motion vector is set to the integral motion vector.

Figure 2:
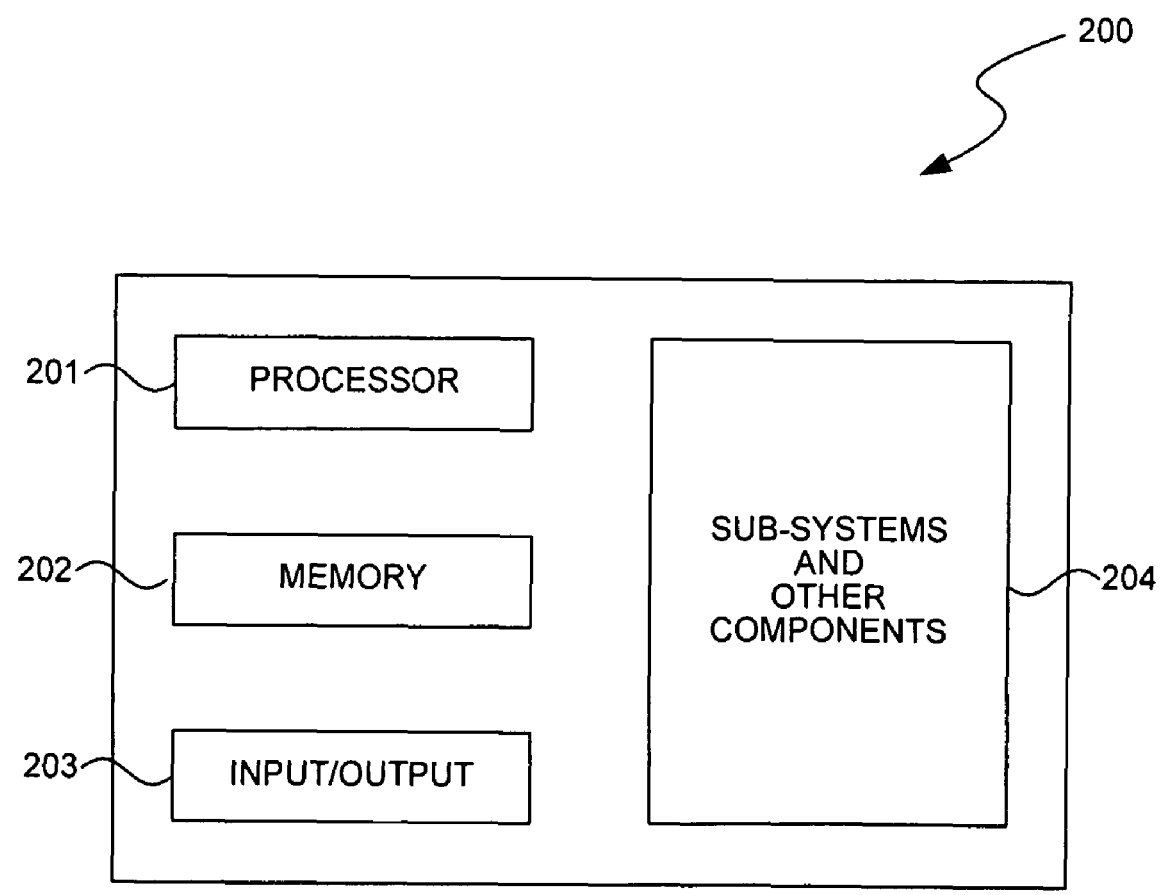
FIG. 2 is a schematic view of a system that can implement the method of FIG. 1 in accordance with embodiments of the disclosure.

Any one of the methods described above with reference to FIG. 1 can be implemented in any of a myriad of larger and/or more complex systems, a representative example of which is system 200 shown schematically in FIG. 2. The system 200 can include a processor 201, a memory 202 (e.g., SRAM, DRAM, flash, and/or other memory device), input/output devices 203, and/or other subsystems or components 204. The foregoing methods described above with reference to FIG. 1 can be included in any of the components shown in FIG. 2. The resulting system 200 can perform any of a wide variety of computing, processing, storage, sensing, imaging, and/or other functions. Accordingly, representative systems 200 include, without limitation, computers and/or other data processors, for example, desktop computers, laptop computers, internet appliances, hand-held devices (e.g., palm-top computers, wearable computers, cellular or mobile phones, personal digital assistants, etc), multi-processor systems, processor-based or programmable consumer electronics, network computers, and mini computers. Other representative systems 200 include cameras, light or other radiation sensors, servers and associated server subsystems, display devices, and/or other memory devices. In such systems, individual dies can include imager arrays, such as CMOS imagers. Components of the system 200 can be housed in a single unit or distributed over multiple, interconnected units (e.g., through a communications network). The components of the system 200 can accordingly include local and/or remote memory storage devices, and any of a wide variety of computer readable media.

From the foregoing, it will be appreciated that specific embodiments of the invention have been described herein for purposes of illustration, but that various modifications can be made without deviating from the inventions. Certain aspects of the invention described in the context of particular embodiments may be combined or eliminated in other embodiments. Additionally, where the context permits, singular or plural terms can also include plural or singular terms, respectively. Moreover, unless the word "or" is expressly limited to mean only a single item exclusive from the other items in reference to a list of two or more items, then the use of "or" in such a list means including (a) any single item in the list, (b) all of the items in the list, or (c) any combination of the items in the list. Additionally, the term "comprising" is used throughout the following disclosure to mean including at least the recited feature(s) such that any greater number of the same feature and/or additional types of features or components is not precluded. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A method for encoding video, comprising:
determining early termination based on the value of a sum of absolute difference (SAD0) by a processor, comprising enabling early termination if SAD0 is less than or equal to a threshold (THRESHOLD);
performing motion prediction using a motion vector from a previous frame as a prediction point by the processor;
using the prediction point as the center to obtain the integral motion vector by conducting a 3×3 cross searching until a minimum sum of absolute difference (minSAD) is located at the center of the cross; and
predicting a location of a half-pixel point based upon a point corresponding to the integral motion vector, values of the minimum sum of absolute difference of other four cross points, wherein THRESHOLD=-500+MAP (QP)×256, and wherein MAP(QP) has the following values:

| QP | 1-7 | 8-11 | 12-15 |
|---|---|---|---|
| MAP(QP) | 4 | 5 | 6. |

2. A method for encoding video, comprising:
determining early termination based on the value of a sum of absolute difference (SAD0) by a processor;
performing motion prediction using a motion vector from a previous frame as a prediction point by the processor;

using the prediction point as the center to obtain the integral motion vector by conducting a 3×3 cross searching until a minimum sum of absolute difference (minSAD) is located at the center of the cross; and predicting a location of a half-pixel point based upon a point corresponding to the integral motion vector, values of the minimum sum of absolute difference of other four cross points, wherein performing motion prediction using a motion vector from a previous frame as a prediction point includes selecting a point having a smaller sum of absolute difference (SADpred) when compared to SAD0 as the predicted point as follows:

SADpred=min(SADpred,SAD0), wherein if SADpred<=THRESHOLD, where THRESHOLD=-500+MAP(QP)×256, then enabling early termination and setting the final motion vector to the predicted point.

3. An apparatus for encoding video, comprising:
at least one of a processor and memory device, wherein the memory device contain codes when executed by the processor performing a method comprising:
determining early termination based on the value of a sum of absolute difference (SAD0), comprising enabling early termination if SAD0 is less than or equal to a threshold (THRESHOLD);
performing motion prediction using a motion vector from a previous frame as a prediction point;
using the prediction point as the center to obtain the integral motion vector by conducting a 3×3 cross searching until a minimum sum of absolute difference (minSAD) is located at the center of the cross; and
predicting a location of a half-pixel point based upon a point corresponding to the integral motion vector, values of the minimum sum of absolute difference of other four cross points, wherein THRESHOLD=-500+MAP(QP)×256, and wherein MAP(QP) has the following values:

| QP | 1-7 | 8-11 | 12-15 |
|---|---|---|---|
| MAP(QP) | 4 | 5 | 6. |

4. An apparatus for encoding video, comprising:
at least one of a processor and memory device, wherein the memory device contain codes when executed by the processor performing a method comprising:
determining early termination based on the value of a sum of absolute difference (SAD0);
performing motion prediction using a motion vector from a previous frame as a prediction point;
using the prediction point as the center to obtain the integral motion vector by conducting a 3×3 cross searching until a minimum sum of absolute difference (minSAD) is located at the center of the cross; and
predicting a location of a half-pixel point based upon a point corresponding to the integral motion vector, values of the minimum sum of absolute difference of other four cross points, wherein performing motion prediction using a motion vector from a previous frame as a prediction point includes selecting a point having a smaller sum of absolute difference (SADpred) when compared to SAD0 as the predicted point as follows:

SADpred=min(SADpred,SAD0), wherein if SADpred<=THRESHOLD, where THRESHOLD=-500+MAP(QP)×256, then enabling early termination and setting the final motion vector to the predicted point.

* * * * *